(12) United States Patent
Tzeng

(10) Patent No.: US 6,686,721 B1
(45) Date of Patent: Feb. 3, 2004

(54) INDUCTIVE CONTROL VALVE USING SOLAR BATTERY AS A SUPPLEMENTARY ENERGY SOURCE

(75) Inventor: Jeffery Tzeng, Taipei (TW)

(73) Assignee: CIP Corporation, Taipei (TW)

( * ) Notice: Subject to any disclaimer, the term of this patent is extended or adjusted under 35 U.S.C. 154(b) by 0 days.

(21) Appl. No.: 10/259,109

(22) Filed: Sep. 26, 2002

(51) Int. Cl.$^7$ ............................................. H01M 10/46
(52) U.S. Cl. ..................................................... 320/108
(58) Field of Search ................................. 320/101, 107, 320/108, 115, 137; 136/291, 293; 4/623

(56) References Cited

U.S. PATENT DOCUMENTS 4,332,101 A * 6/1982 Tomica
4,823,414 A * 4/1989 Piersimoni et al.
5,694,653 A * 12/1997 Harald

* cited by examiner

Primary Examiner—Edward H. Tso
(74) Attorney, Agent, or Firm—W. Wayne Liauh

(57) ABSTRACT

An inductive control valve using solar battery as a supplementary energy source mainly includes an amorphous silicon solar battery fixedly mounted on a casing of an inductive flushing valve or a main body of an inductive water faucet. Positive and negative lead-outs of the amorphous silicon solar battery are parallelly connected to positive and negative electrodes of a charging battery to form a parallel power supply. And, an output of the parallel power supply is further connected to a power input of a micro-power-consumption inductive controller. The solar battery not only provides driving power needed by the control valve, but also charges the charging battery.

5 Claims, 2 Drawing Sheets

INDUCTIVE CONTROL VALVE USING SOLAR BATTERY AS A SUPPLEMENTARY ENERGY SOURCE

FIELD OF THE INVENTION

The present invention relates to an inductive control valve using solar battery as a supplementary energy source, and more particularly to an inductive control valve including a solar battery that not only provides driving power to the control valve, but also charges a charging battery of the inductive control valve.

BACKGROUND OF THE INVENTION

Conventional inductive flushing valves and inductive water faucets are powered with alternating currents and have two disadvantages, namely, being inconvenient for mounting and unsafe for use. Therefore, most newly developed inductive flushing valves and inductive water faucets are powered with batteries.

Since the battery-powered inductive flushing valve and water faucet are always in a working state all day long, it is necessary to replace the batteries thereof frequently. The frequent replacement of batteries not only increases the cost of using the inductive flushing valve or water faucet and brings inconvenience to the users, but also has adverse influence on the living environments.

To reduce the replacement of batteries, most inductive flushing valves and water faucets of prior art are designed to include a low-power-consumption inductive controller and use high-capacity batteries to extend the operating time of the batteries as long as possible.

In addition to the development of inductive controllers having even lowered power consumption, there are also new approaches to supplement power needed by the inductive control valve through natural energy sources. In Japan, there is an inductive water faucet using the dynamic force of running water to achieve self-power-generation, and using the generated power as a supplementary power source of the inductive faucet. As a matter of fact, using the dynamic force of running water to generate power requires not only a costly generator, but also other mechanisms, such as vane wheels and bearings. These additional members complicate the initially structurally simple inductive water faucet while increase the cost of the faucet and reduce the reliability thereof. Moreover, in the case of generating supplementary power by using the dynamic force of running water, the supplementary power is generated only at the instant running water flows out of the faucet. Therefore, the effect of using the dynamic force of running water to supplement power needed by the inductive faucet is not significant.

SUMMARY OF THE INVENTION

It is a primary object of the present invention to provide an inductive control valve using solar battery as a supplementary energy source, so that the inductive control valve is low cost, highly reliable, and easily implemented, and power consumed by the battery of the inductive control valve can be supplemented from time to time.

The inductive control valve using solar battery as a supplementary energy source according to the present invention includes an amorphous silicon solar battery having a peak value of spectral response about 600 nm. The amorphous silicon solar battery is fixedly mounted on a casing of an inductive flushing valve or an inductive water faucet. Positive and negative lead-outs of the amorphous silicon solar battery are parallelly connected to positive and negative electrodes of a NiMH battery pack to provide a parallel power supply, an output of the parallel power supply is then parallelly connected to a power input of a micro-power-consumption inductive controller. The amorphous silicon solar battery not only provides driving power heeded by the micro-power-consumption inductive controller, but also charges the NiMH battery pack.

The inductive control valve using solar battery as a supplementary energy source according to the present invention comprising a NiMH battery pack, an amorphous silicon solar battery, and a micro-power-consumption inductive controller has simple structure and does not require costly big-capacity capacitor, and can therefore be manufactured at low cost.

The inductive control valve using solar battery as a supplementary energy source according to the present invention may otherwise comprise a Li-polymer battery, an amorphous silicon solar battery, a super-capacity capacitor, and a micro-power-consumption inductive controller. The Li-polymer battery is parallelly connected to the super-capacity capacitor to enable the inductive control valve using solar battery as a supplementary energy source of the present invention to have a main power-supply battery that need not be charged.

The inductive control valve using solar battery as a supplementary energy source according to the present invention comprising the Li-polymer battery, the amorphous silicon solar battery, the super-capacity capacitor, and the micro-power-consumption inductive controller has the advantages that the Li-polymer battery has high battery capacity and low self-discharging rate, can be stored for a prolonged time, and is free of charging, and that the super-capacity capacitor is repeatedly rechargeable, and has very low internal resistance, high capacity, and small volume.

The inductive control valve using solar battery as a supplementary energy source according to the present invention has the advantages of converting the diffused light in the daytime, the light of fluorescent lamp, and the light of incandescent lamp into electric energy, and of utilizing the amorphous silicon solar battery that works well under an environment having only dim light. The inductive control valve of the present invention also fully utilizes the advantages of the NiMH battery pack that has not memory effect and can be continuously charged, and of the most up-to-date super-capacity capacitor that is repeatedly rechargeable, and has very low internal resistance, high capacity, and small volume. With the present invention, weak currents output by the solar battery are effectively collected to provide a new way of supplementing energy to indoor inductive control valves, enabling automatic inductive control valves to replace the conventional manual faucets and flushing valves and provide a new alternative to consumers.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 2:
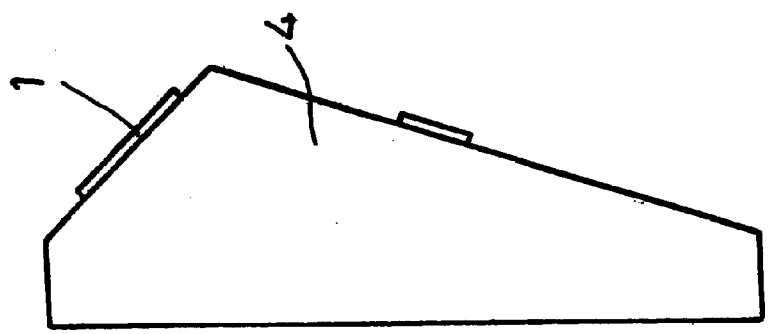
FIG. 2 is a side view of an inductive flushing valve that is an application example of the inductive control valve of FIG. 1.
Figure 1:
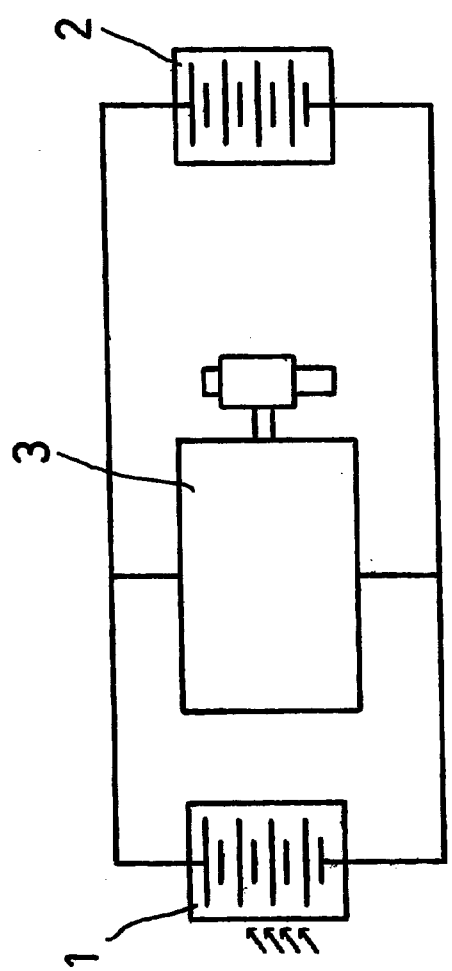
FIG. 1 is a schematic diagram showing the basic principle employed in an inductive control valve using a NiMH battery pack as a main power source and a solar battery as a supplementary energy source according to a first embodiment of the present invention.

Please refer to FIG. 1 that is a schematic diagram showing the basic principle employed in an inductive control valve using a NiMH battery pack 2 as a main power source and a solar battery 1 as a supplementary energy source according to a first embodiment of the present invention, and to FIG. 2 that is a side view of an inductive flushing valve 4 that is an application example of the inductive control valve of FIG. 1.

The inductive flushing valve 4 mainly includes a solar battery 1, a NiMH battery pack 2, a micro-power-consumption inductive controller 3, and a main body for the inductive flushing valve 4. The solar battery 1 is an amorphous silicon battery having a peak value of spectral response about 600 nm, and an open-circuit voltage of 8V and short-circuit current no less than 14 $\mu$A under a white light having a light intensity of 200 Lux and an ambient temperature of 25° C. The amorphous silicon solar battery 1 is tightly attached to or adhesively bonded to the main body of the inductive flushing valve 4. Lead-outs of the amorphous silicon solar battery 1 are parallelly connected to positive and negative lead-outs of the NiMH battery pack 2, which includes four pieces of 1.2V cells, to provide a parallel power supply. The parallel power supply has an output parallelly connected to a power input of the micro-power-consumption inductive controller 3. The micro-power-consumption inductive controller 3 itself is a known art.

When the above-described inductive flushing valve 4 using solar battery as a supplementary energy source is exposed to diffused light in the daytime or to light from a fluorescent lamp or an incandescent lamp, and the micro-power-consumption inductive controller 3 has a nominal working voltage of 6V and a load of static current lower than 14 microamperes, a terminal voltage of the parallel power supply varies with every changes of illumination intensity, and volumes and directions of branch currents of the inductive flushing valve vary with every changes of outside light. The outside light causes increase in an electromotive force of the solar battery 1 that results in an increased terminal voltage of the parallel power supply. When the terminal voltage becomes higher than an electromotive force of the NiMH battery pack 2, the solar battery 1 becomes a main working power source and supplies power to the micro-power-consumption controller 3. At this point, a part of the current from the solar battery 1 flows toward the micro-power-consumption controller 3, while the other part flows toward the NiMH battery pack 2 to charge the latter in the manner of trickle charging. The higher the light intensity is, the higher the charging current is. A typical value of the charging current measured from the present invention is from zero to 65 microamperes under diffused light in a shiny day.

When the intensity of outside light gradually decreases, the electromotive force of the solar battery 1 reduces accordingly. Meanwhile, the terminal voltage of the parallel power supply drops, too. When the terminal voltage becomes lower than the electromotive force of the NiMH battery pack 2, the latter automatically turns to be a main power-supply voltage and starts supplying power to the micro-power-consumption controller 3. Due to an effect of P-N junction of the solar battery 1, the current is irreversible. Therefore, the solar battery 1 has a branch current of zero (a reverse leakage current at the P-N junction is ignored), and the volume of current supplied by the NiMH battery pack 2 is equal to the working current of the micro-power-consumption controller 3. Thus, even in the nighttime without any illuminating light, the solar battery 1 would not become a load of the whole system to consume any energy of the NiMH battery pack 2.

When the inductive controller 3 detects someone is using the flushing valve 4, it drives an indicating light (not shown) to turn on and off and a valve gate (not shown) to open and shut. At this point, a larger current must be supplied. With the increased load, the terminal voltage of the parallel power supply quickly drops. When the terminal voltage becomes lower than the electromotive force of the NiMH battery pack 2, the NiMH battery pack 2 automatically starts supplying power to the flushing valve 4. Since the NiMH battery pack 2 has a lower internal resistance, it is able to quickly supply current needed to drive the valve gate open and shut. After the valve gate has been opened and shut again, the inductive controller 3 enters into a standby state. With the decreased load of the flushing valve 4, the terminal voltage of the parallel power supply rises. When the terminal voltage becomes higher than the electromotive force of the NiMH battery pack 2, the solar battery 1 automatically replaces the NiMH battery pack 2 to supply power to the inductive controller 3. The inductive controller 3 in the standby state consumes a part of the electric energy supplied by the solar battery 1, and the remained part is supplied to the NiMH battery pack 2 through trickle charging.

Figure 4:
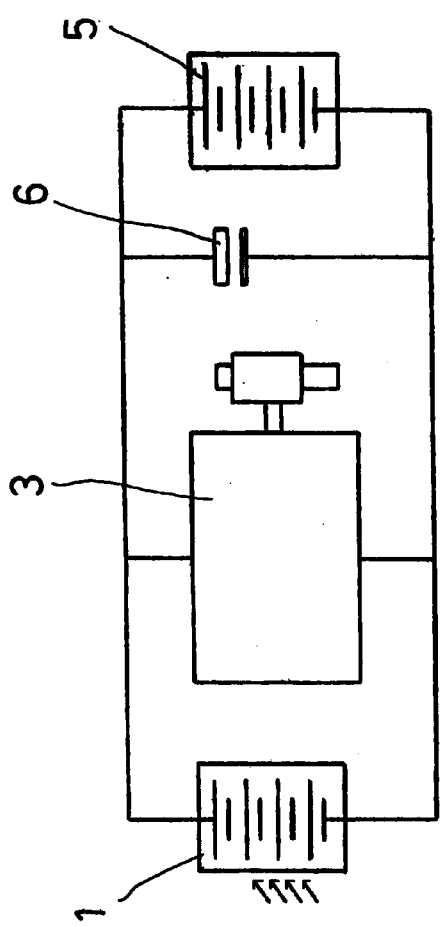
FIG. 4 is a side view of an inductive water faucet that is an application example of the inductive control valve of FIG. 3.
Figure 3:
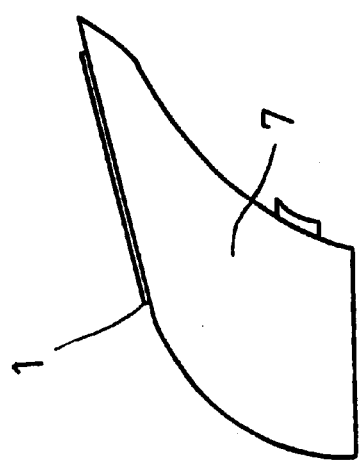
FIG. 3 is a schematic diagram showing the basic principle employed in an inductive control valve using a Li-polymer battery as a main power source and a solar battery as a supplementary energy source according to a second embodiment of the present invention.

Please now refer to FIG. 3 that is a schematic diagram showing the basic principle employed in an inductive control valve using a Li-polymer battery 5 as a main power source and a solar battery 1 as a supplementary energy source according to a second embodiment of the present invention, and to FIG. 4 that is a side view of an inductive water faucet 7 that is an application example of the inductive control valve of FIG. 3.

The inductive water faucet 7 mainly includes a solar battery 1, a Li-polymer battery 5, a super-capacity capacitor 6, a micro-power-consumption inductive controller 3, and a main body of the inductive water faucet 7. The solar battery 1 is an amorphous silicon battery having a peak value of spectral response about 600 nm, and an open-circuit voltage of 8V and short-circuit current no less than 14 $\mu$A under a white light having a light intensity of 200 Lux and an ambient temperature of 25° C. The amorphous silicon solar battery 1 is tightly attached to or adhesively bonded to the casing of the inductive water faucet 7. Lead-outs of the amorphous silicon solar battery 1 are parallelly connected to positive and negative lead-outs of the Li-polymer battery 5 and of the super-capacity capacitor 6 to provide a multiple-parallel power supply. The parallel power supply has an output parallelly connected to a power input of the micro-power-consumption inductive controller 3.

When the above-described inductive water faucet 7 using solar battery as a supplementary energy source is exposed to diffused light in the daytime or to light of fluorescent lamps or incandescent lamps, and the inductive controller 3 has a nominal working voltage of 6V and a load of static current lower than 14 microamperes, since the capacitor 6 is not charged at the beginning of power supplying, it is also a load in the system. Under the circumstance that the capacitor 6 is a big load, the terminal voltage of the parallel power supply drops so quickly that the Li-polymer battery 5 and the solar battery 1 charge the capacitor 6 in addition to supply power to the inductive controller 3. Since the Li-polymer battery 5 has lower internal resistance, it is able to quickly charge the capacitor 6. When the capacitor 6 is quickly charged, the terminal voltage of the parallel power supply also quickly rises and the charging current from the Li-polymer battery 5 gradually decreases. When a potential difference between positive and negative electrodes of the capacitor 6 becomes close to a voltage of 3.6V supplied by the Li-polymer battery 5, the Li-polymer battery 5 stops charging the capacitor 6.

On the other hand, the electromotive force of the solar battery 1 constantly increases under ambient illuminating light while the charging current to the parallel power supply decreases and the load reduces. When the electromotive force of the solar battery 1 becomes higher than an electromotive force of the Li-polymer battery 5, the solar battery 1 automatically replaces the Li-polymer battery 5 to function as the main power supply to supply power to the inductive controller 3. Volumes and directions of currents output by the solar battery 1 vary with every changes of outside light intensities. When the current output by the solar battery 1 becomes higher than the 14 microamperes needed by the inductive controller 3, the extra part of the current supplied by the solar battery 1 flows toward the capacitor 6 to charge the same. Since the capacitor 6 has a maximum working voltage higher than the electromotive force of the Li-polymer battery 5, and has a super large capacity, it can be charged in the manner of trickle charging over a long time. As the solar-battery 1 continuously charges the capacitor 6, power stored in the capacitor 6 gradually increases and the potential difference between the positive and negative electrodes of the capacitor 6 gradually rises to results in gradually increased terminal voltage of the parallel power supply.

When the micro-power-consumption inductive controller 3 detects someone is using the water faucet 7, it drives an indicating light and a valve gate to open and shut. At this point, a larger current must be supplied. Since the super-capacity capacitor 6 has been continuously charged by the solar battery 1, it has a potential difference between positive and negative electrodes larger than the electromotive force of the Li-polymer battery 5. Thus, the capacitor 6 starts discharging alone. While the discharge continues, the potential difference between positive and negative electrodes of the capacitor 6 gradually decreases. When the potential difference decreases to be lower than the electromotive force of the Li-polymer battery 5, the Li-polymer battery 5 starts supplying power along with the capacitor 6 to the inductive controller 3. Since both the super-capacity capacitor 6 and the Li-polymer battery 5 have lower internal resistance, they are able to quickly supply current needed to open and shut the valve gate. Meanwhile, since the inductive controller 3 opens and shuts again within very short time less than 50 milliseconds, the valve gate thereof could be quickly opened and shut again.

After the valve gate has been opened and shut again, the inductive controller 3 enters into a standby state and consumes only very low power. The potential difference between positive and negative electrodes of the capacitor 6 varies with power discharged by the super-capacity capacitor 6. When the potential difference is higher than the electromotive force of the Li-polymer battery 5, the latter does not work. Otherwise, the Li-polymer battery 5 charges the capacitor 6 again. As a result of charging, the potential difference between positive and negative electrodes of the capacitor 6 increases and the terminal voltage of the parallel power supply rises. When the terminal voltage of the parallel power supply rises to become higher than the electromotive force of the Li-polymer battery 5 again, the solar battery 1 automatically replaces the Li-polymer battery 5 to supply power to the inductive controller 3. Extra part of power supplied by the solar battery 1 other than that having been supplied to the inductive controller 3 is supplied to the capacitor 6 through trickle charging.

When the intensity of outside light gradually decreases, the electromotive force of the solar battery 1 gradually reduces and current output from the solar battery 1 decreases accordingly. When the electromotive force of the solar battery 1 becomes lower than the potential difference between positive and negative electrodes of the capacitor 6, the solar battery 1 stops charging the capacitor 6. However, if the solar battery 1 has an electromotive force that is still higher than that of the LI-polymer battery 5, it will continue supplying power to the Li-polymer battery 5. When the intensity of outside light becomes weaker and weaker to such an extent that the solar battery 1 has an electromotive force lower than that of the Li-polymer battery 5, the solar battery 1 finally stops outputting current and the capacitor 6 and the Li-polymer battery 5 now replaces the solar battery 1 to power the inductive controller 3. Due to the effect of P-N junction of the solar battery 1, the solar battery 1 does not absorb the current output by the capacitor 6 or the Li-polymer battery 5, and would not become a load to consume any energy.

The present invention has been described with some preferred embodiments thereof and it is understood that many changes and modifications in the described embodiments can be carried out without departing from the scope and the spirit of the invention as defined by the appended claims.

What is claimed is:

1. An inductive control valve using solar battery as a supplementary energy source, comprising an amorphous silicon solar battery, a NiMH battery pack, a micro-power-consumption inductive controller, and a main body for an inductive flushing valve or an inductive water faucet; said amorphous silicon solar battery being fixedly mounted on said main body of said inductive flushing valve or said inductive water faucet; said amorphous silicon solar battery having positive and negative lead-outs parallelly connected to positive and negative electrodes of said NiMH battery pack to provide a parallel power supply, and an output of said parallel power supply being parallelly connected to a power input of said micro-power-consumption inductive controller.

2. The inductive control valve using solar battery as a supplementary energy source as claimed in claim 1, wherein said amorphous silicon solar battery has a peak value of spectral response about 600 nm.

3. An inductive control valve using solar battery as a supplementary energy source, comprising an amorphous silicon solar battery, a Li-polymer battery, a super-capacity capacitor, a micro-power-consumption inductive controller, and a main body for an inductive flushing valve; said amorphous silicon solar battery having positive and negative lead-outs parallelly connected to positive and negative electrodes of said Li-polymer battery and of said super-capacity capacitor to provide a multiple-parallel power supply, and an output of said parallel power supply being parallelly connected to a power input of said micro-power-consumption inductive controller.

4. The inductive control valve using solar battery as a supplementary energy source as claimed in claim 3, wherein said amorphous silicon solar battery has a peak value of spectral response about 600 nm.

5. The inductive control valve using solar battery as a supplementary energy source as claimed in claim 3, wherein said Li-polymer battery has a nominal working voltage lower than a maximum working voltage of said super-capacity capacitor.

* * * * *